No. 639,114. Patented Dec. 12, 1899.
R. F. TOCHTERMANN.
COIN OPERATED DEVICE FOR DISPENSING LIQUIDS.
(Application filed Mar. 18, 1899.)
(No Model.)
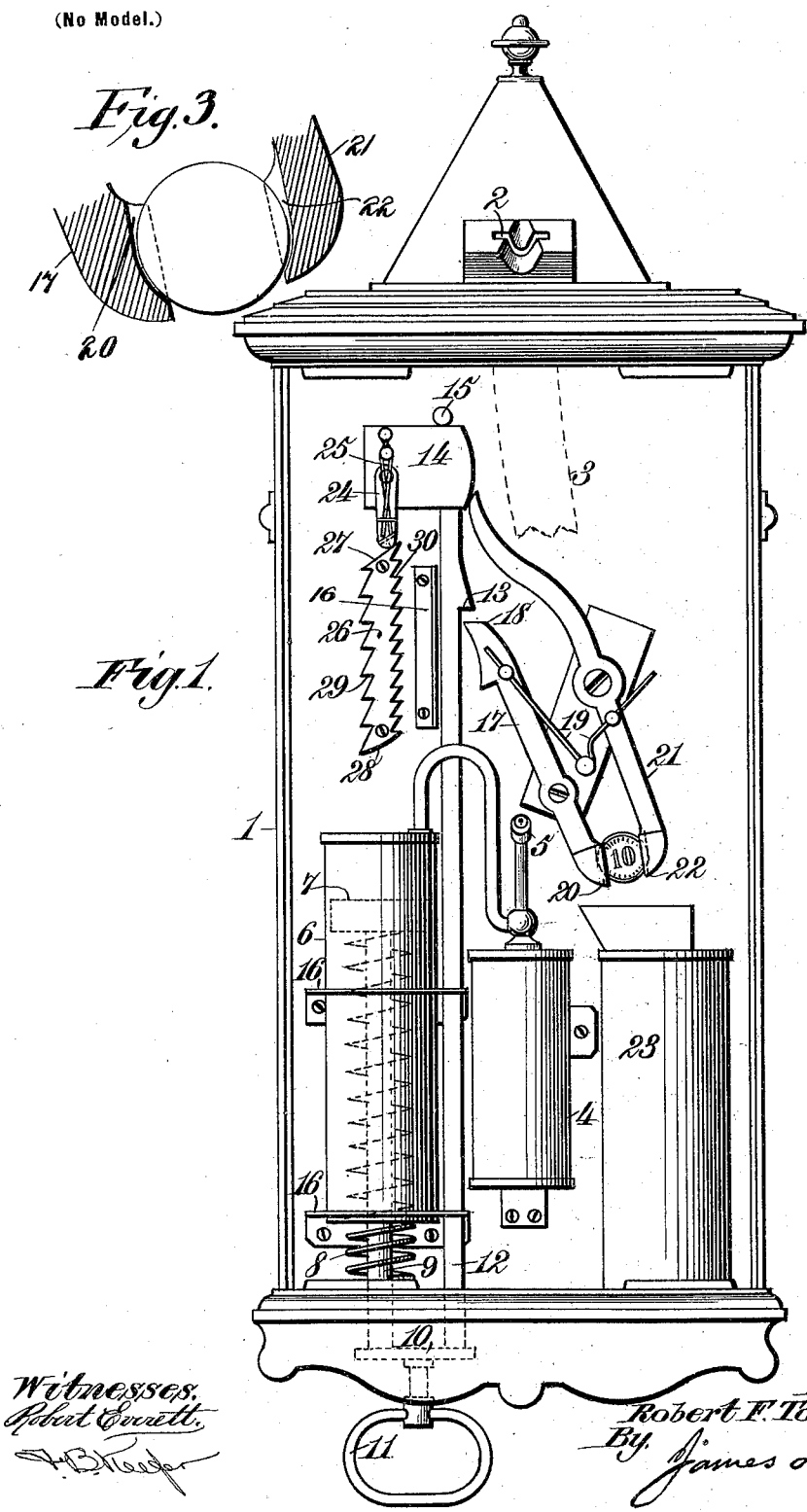

UNITED STATES PATENT OFFICE.

ROBERT FRED. TOCHTERMANN, OF NEW YORK, N. Y.

COIN-OPERATED DEVICE FOR DISPENSING LIQUIDS.

SPECIFICATION forming part of Letters Patent No. 639,114, dated December 12, 1899.

Application filed March 18, 1899. Serial No. 709,665. (No model.)

*To all whom it may concern:*

Be it known that I, ROBERT FRED. TOCHTERMANN, a subject of the Emperor of Germany, (but having declared my intention of becoming a citizen of the United States,) residing at New York, in the county of New York and State of New York, have invented new and useful Improvements in Coin-Operated Devices for Dispensing Liquids, of which the following is a specification.

My invention relates to coin-controlled dispensing apparatus, the same being particularly designed for use in dispensing small quantities of liquid, like cologne, for which a small toll is charged.

Specifically stated, the invention consists of a tank or container for the liquid to be dispensed, having a nozzle thereon whose mouth projects from the casing of the machine, a compression-cylinder, a spring-actuated piston therein, a rod connected to the piston and provided with a shoulder and with a cam, a pivotally-mounted locking-lever adapted to engage said shoulder, and a pivotally-mounted releasing-lever adapted to be engaged by said cam and coöperating with said locking-lever to grip a coin of proper size which is introduced into the machine and thereby act when said rod is moved in one direction to shift said locking-lever from the path of movement of the shoulder on said rod.

The invention also consists in certain details of construction and combinations of parts, which will be hereinafter more fully described and claimed.

In the drawings forming part of the specification, Figure 1 is an elevation of the device with the front wall of the casing removed to show the operating parts contained within the casing. Fig. 2 represents a detail.

The casing 1 may be of any suitable form or construction, being provided with a coin-slot 2 at the upper end and a coin-chute 3, leading downwardly therefrom. Within the casing is suitably secured a tank or container 4 for the liquid to be dispensed, having a nozzle 5 communicating therewith and projecting slightly beyond the front wall of the casing. Communicating with the tank or container 4 is a compression-cylinder 6, having a piston 7 therein, which is normally urged upwardly by means of a coil-spring 8, which surrounds the piston-rod 9 thereof. Upon the lower end of the piston-rod is a cross-bar 10, to which is attached an operating-handle 11. Also secured to the cross-bar 10 and extending upwardly therefrom along one side of the cylinder 6 is a rod 12, having a laterally-extending shoulder 13 thereon and carrying a cam 14 upon its upper end. The upward movement of said rod and the piston to which the same is connected is limited by the engagement of the cam 14 with the stop-pin 15, secured to the casing. The rod 12 is guided in its upward and downward movements by means of the flanged guide-plate 16, and the same is normally held against downward movement by means of the locking-lever 17, which is fulcrumed at a point intermediate of its ends to the casing and is provided with a prong or tooth 18 upon its upper end, which is normally held in the path of movement of and is adapted to be engaged by the shoulder 13 on said rod. The said lever is retained in its locking position by means of the spring 19, and the lower end of said lever constitutes one of a pair of gripping-jaws for the coin, the same being provided with a groove 20. Coöperating with the rod 12 and the locking-lever 17 is a releasing-lever 21, which is fulcrumed to the casing at a point intermediate of its ends and has its upper arm normally held in engagement with the cam 14 by means of the spring 19, heretofore referred to. The lower end of the other arm of said releasing-lever constitutes the other gripping-jaw for the coin and is provided with a groove 22 similar to the groove 20 in the lever 17. Located beneath the lower ends of the levers 17 and 21 is a coin-receptacle 23, of any suitable form.

The operation of the device, as above described, is as follows, it being of course understood that downward movement of the rod 12 is normally resisted by the engagement of the shoulder 13 on said rod with the tooth or prong 18 on the locking-lever 17. The coin being introduced into the slot 2 will fall by gravity through the chute 3 and be grasped by the jaws formed by the lower ends of the levers 17 and 21, the coin being received in the grooves 20 and 22 therein. This lodgment of the coin in the grooves 20 and 21 is caused by the fact that outward movement of the lower ends of both levers 17 and 21 is resisted, the former by the action of the spring 19 on the upper end thereof and the latter by the engagement of its upper arm with the cam 14, and by the fact that the bottom walls of said grooves terminate in shoulders which serve as stops for preventing the passage of the coin entirely through the space between the gripping ends of said levers. The coin is held in this position, and when so held the rocking movement of the lever 21 will cause a corresponding rocking movement of the lever 17. Power being now applied to the handle 11 to draw the rod 12 downwardly, the cam 14 will engage the upper arm of the lever 21 and move said arm to the right, causing a corresponding movement of the lower arm of said lever to the left. This action through the coin held by the gripping-jaws of said levers is transmitted to the locking-lever 17, throwing the lower arm thereof to the left and the upper arm thereof to the right. When this has been done, the tooth or prong 18 is removed from the path of the shoulder 13, and the 12 rod is then free to be moved downwardly, carrying with it the piston 7 of the cylinder 6 against the action of its spring 8. When the cam 14, however, comes opposite the prong 18 on the upper end of the lever 17 and engages it, the lower end of said lever 17 is thrown to the left independent of the lever 21 and the coin is released from the gripping-jaws and delivered into the coin-receptacle 23. The return movement of the parts is effected by the spring 8, at which time air is forced by the piston 7 from the cylinder 6 into the tank or container 4, and a small quantity of perfume or other liquid is sprayed from the nozzle 5. When the parts are returned to their normal positions the lever 17 is in position to lock the rod 12 against further downward movement until another coin of proper size has been introduced into the machine and the action above described repeated. It will of course be understood that unless a coin be held between the levers 17 and 21, at the gripping-points thereof, the slight downward movement of the rod 12, which is permitted by reason of the fact that the shoulder 13 is located slightly above the prong 18 of the lever 17, will impart no movement to the lever 17 by reason of the fact that there is no contact between said levers 17 and 21.

In devices of the character contemplated by the present invention it frequently happens that attempts will be made to secure more than one action of the spraying device when the operative parts are released by the introduction of a single coin by permitting a partial return of the parts to their normal position and then while still released operate them to cause another action of the spraying mechanism. In order to prevent this, I have provided upon the cam 14 a pivotally-mounted dog 24, which is acted upon by a double spring 25 to hold said dog normally in a vertical position, but to permit of a slight swinging movement thereof in both directions. Coöperating with this dog is a rack-bar 26, fixed in position to the casing 1, provided with an inclined upper wall or edge 27, a similar inclined lower wall or edge 28, and two sets of teeth 29 30, located, respectively, on opposite side edges thereof, the shouldered portions of the teeth 29 and 30 facing in opposite directions. With this device applied as illustrated and described its action is as follows: Downward movement being imparted to the rod 12 causes downward movement of the cam 14 and the dog 24, carried thereby. The engaging portion of said dog rides over the inclined upper wall 27 and is thereby moved on its pivotal connection to the left, the spring 25 acting to return said dog to its normal vertical position. Passing from the wall 27, said dog is brought into engagement with the teeth 29 in succession on one side of the rack-bar 26, and upward or backward movement of the rod 12 is prevented. In order to return the rod and the parts operated thereby to their normal positions after they have been released, it is necessary that said rod be drawn downwardly to the full extent of its stroke until the engaging portion of the dog 24 passes beyond the lower end of the rack-bar 26. Upon reaching the lower end of said rack-bar the spring 25 throws the dog 24 to the right, and then upon the upward movement of the rod 12 the engaging portion of said dog rides over the inclined lower wall 28 of the rack-bar and takes a position on the opposite side of said bar, so that it is adapted to engage the teeth 30 thereof. When in this position, it is impossible to draw the rod 12 downwardly, and the parts must be returned to their normal raised position. The said dog serves, therefore, not only to prevent the action of the spraying mechanism more than once for a single toll, but also makes it necessary that the rod 12 and the parts operated thereby be drawn downward to the full extent of the stroke before any action of the spraying or dispensing mechanism proper can take place.

Having now described my invention, what I claim as new, and desire to secure by Letters Patent, is—

1. In coin-controlled apparatus, an operating-rod, a stop thereon, a cam operated thereby and pivotally mounted locking and releasing levers adapted to be coupled by a coin of proper size, so that the movement of one will be imparted to the other, the releasing-lever being adapted to be engaged by said cam during the first part of the movement of the operating-rod and the locking-lever normally lying in the path of movement of said stop and adapted to be engaged by said cam after the releasing-lever has been actuated, for the purpose of moving said locking-lever independent of said releasing-lever and thereby disengaging the coin.

2. In coin-controlled apparatus, an operating-rod, a stop thereon, a cam operated thereby, a releasing-lever adapted to be engaged by said cam, a locking-lever normally lying in the path of movement of said stop and also adapted to be engaged by said cam, and means for retaining a coin between said levers, as and for the purpose set forth.

3. In coin-controlled apparatus, an operating-rod, a stop thereon, a cam operated thereby, a releasing-lever adapted to be engaged by said cam, a locking-lever normally lying in the path of movement of said stop and also adapted to be engaged by said cam, and gripping means on said levers for retaining a coin between them, as and for the purpose set forth.

4. In coin-controlled apparatus, an operating-rod, a stop thereon, a cam carried thereby, a releasing-lever adapted to be engaged by said cam, a locking-lever lying in the path of movement of said stop and also adapted to be engaged by said cam, coin-gripping jaws formed by the adjacent arms of said levers, and a spring for normally retaining said jaws in gripping relation to each other, as and for the purpose set forth.

5. In coin-controlled apparatus, an operating-rod having a shoulder thereon, a cam actuated by said rod, a releasing-lever adapted to be engaged by said cam, a locking-lever lying in the path of movement of said shoulder, coin-gripping jaws formed by the two adjacent arms of said levers having coin-receiving grooves therein, and a spring for holding said jaws in gripping relation to each other.

6. In a coin-controlled liquid-dispensing apparatus, a tank or container for the liquid to be dispensed, a compression-cylinder communicating with said tank, a spring-actuated piston for said cylinder, an operating-rod connected to said piston, having a shoulder thereon, a cam carried by said rod, a locking-lever normally lying in the path of movement of said shoulder, a releasing-lever adapted to be engaged by said cam, and means for retaining a coin between said levers for causing the movement of one to be imparted to the other.

In testimony whereof I have hereunto set my hand in the presence of two subscribing witnesses.

RBT. FRED. TOCHTERMANN.

Witnesses:
JOHN S. SCHNEIDER,
GEO. W. REA.